US009475072B2

(12) United States Patent
Norkus et al.

(10) Patent No.: US 9,475,072 B2
(45) Date of Patent: Oct. 25, 2016

(54) METHOD AND APPARATUS FOR DIRECTING SPREADER SPRAY

(71) Applicant: Swenson Spreader, LLC, Lindenwood, IL (US)

(72) Inventors: Christopher Norkus, Creston, IL (US); James Schaefer, Cherry Valley, IL (US)

(73) Assignee: Swenson Spreader, LLC, Lindenwood, IL (US)

( * ) Notice: Subject to any disclaimer, the term of this patent is extended or adjusted under 35 U.S.C. 154(b) by 0 days.

(21) Appl. No.: 14/791,508

(22) Filed: Jul. 6, 2015

(65) Prior Publication Data

US 2016/0023223 A1 Jan. 28, 2016

Related U.S. Application Data

(62) Division of application No. 13/787,529, filed on Mar. 6, 2013, now Pat. No. 9,085,863.

(60) Provisional application No. 61/607,541, filed on Mar. 6, 2012.

(51) Int. Cl.

| | |
|---|---|
| ***A01C 19/00*** | (2006.01) |
| ***B05B 3/04*** | (2006.01) |
| ***E01H 10/00*** | (2006.01) |
| ***E01C 19/20*** | (2006.01) |

(52) U.S. Cl.

CPC ........... *B05B 3/0486* (2013.01); *E01C 19/203* (2013.01); *E01H 10/007* (2013.01)

(58) Field of Classification Search

CPC ..... B65D 83/06; B65D 83/04; E01C 19/203; B60P 1/006; B05B 3/0486

USPC ....... 239/650, 668, 669, 652, 665, 659, 666, 239/676, 681, 172, 176; 222/624

See application file for complete search history.

(56) References Cited

U.S. PATENT DOCUMENTS

| | | | | |
|---|---|---|---|---|
| 4,157,150 | A | 6/1979 | Hetrick | |
| 4,166,581 | A | 9/1979 | Hetrick | |
| 5,618,002 | A * | 4/1997 | Cervelli | B60P 3/30 239/657 |
| 5,669,531 | A * | 9/1997 | Hagemeyer | B60P 1/40 198/671 |
| 5,947,391 | A | 9/1999 | Beck | |
| 6,398,137 | B1 * | 6/2002 | Manon | A01C 15/18 239/672 |
| 6,446,879 | B1 | 9/2002 | Kime | |
| 6,978,952 | B2 | 12/2005 | Kost | |
| 8,511,589 | B2 | 8/2013 | Richardson et al. | |
| 2011/0186649 | A1 * | 8/2011 | Richardson | E01H 10/007 239/146 |

* cited by examiner

*Primary Examiner* — Arthur O Hall
*Assistant Examiner* — Juan C Barrera
(74) *Attorney, Agent, or Firm* — Emerson Thomson Bennett, LLC; Roger D. Emerson

(57) ABSTRACT

A chute assembly may include a chute having an inlet and an outlet and an adjustment mechanism. The adjustment mechanism may be used to move the chute to adjust the outlet: forward to back with respect to a spinner disc; and/or, (2) side to side with respect to the spinner disc in order to change the spreading characteristics.

17 Claims, 9 Drawing Sheets

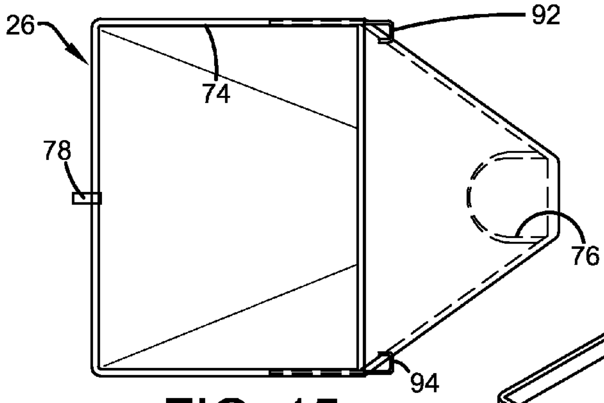
FIG. 15
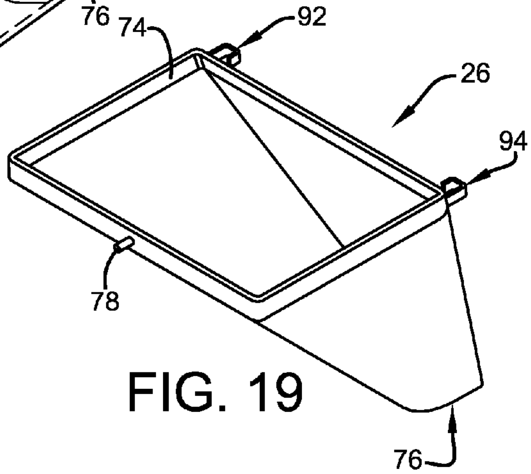
FIG. 19
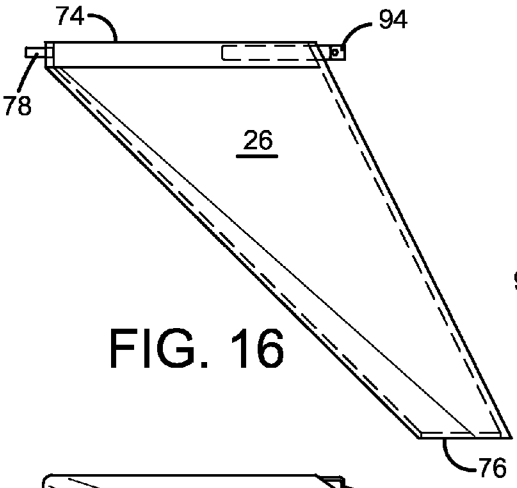
FIG. 16
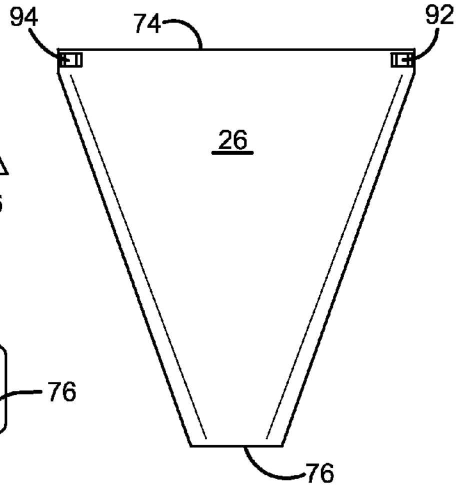
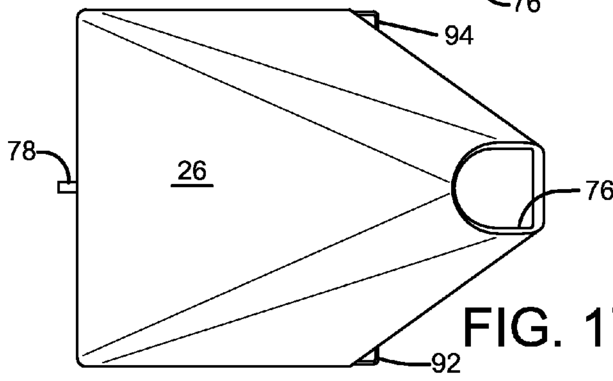
FIG. 17
FIG. 18

METHOD AND APPARATUS FOR DIRECTING SPREADER SPRAY

This application is a divisional of U.S. patent application Ser. No. 13/787,529 filed Mar. 6, 2013, entitled METHOD AND APPARATUS FOR DIRECTING SPREADER SPRAY, which claims the benefit of U.S. Provisional Patent Application No. 61/607,541 filed Mar. 6, 2012, entitled METHOD AND APPARATUS FOR DIRECTING SPREADER SPRAY, the contents of which are incorporated herein by reference.

I. BACKGROUND OF THE INVENTION

A. Field of Invention

This invention generally relates to the apparatus and methods of spreading salt.

II. BRIEF SUMMARY OF THE INVENTION

The invention is a spreader assembly demonstrated by embodiments set forth below.

According to one embodiment of this invention, a chute assembly may comprise: a frame comprising: (1) structure that is designed to be mounted to an associated hopper that dispenses salt or the like; and, (2) an arm having: a proximal end attached to the structure; and, a distal end; a spinner disc assembly comprising: (1) a spinner disc that: is supported to the arm; positioned near the distal end of the arm; and, has a receiving surface; and, (2) a motor that: is supported to the arm; and, rotates the spinner disc; a chute that is supported to the frame and that comprises a proximal end having an inlet and a distal end having an outlet; wherein the chute is positioned to communicate associated salt or the like from the associated hopper, into the inlet, out through the outlet, and onto the receiving surface of the spinner disc; an adjustment mechanism that is supported to the frame and that moves the chute to adjust the outlet: (1) forward to back with respect to the receiving surface of the spinner disc; and, (2) side to side with respect to the receiving surface of the spinner disc. The movement forward to back may be substantially perpendicular to movement side to side.

According to another embodiment of this invention, a chute assembly method may comprise the steps of: (A) providing a chute assembly comprising: a frame comprising: (1) structure; and, (2) an arm having: a proximal end attached to the structure; and, a distal end; a spinner disc assembly comprising: (1) a spinner disc that: is supported to the arm; positioned near the distal end of the arm; and, has a receiving surface; and, (2) a motor that: is supported to the arm; a chute that is supported to the frame and that comprises a proximal end having an inlet and a distal end having an outlet; and, an adjustment mechanism supported to the frame; and, (B) wherein the chute assembly is operable to perform the steps of: (1) mounting the structure to an associated hopper that dispenses associated salt or the like; (2) using the adjustment mechanism to move the chute to adjust the outlet side to side a first direction with respect to the receiving surface of the spinner disc; (3) dispensing the associated salt or the like from the associated hopper, into the inlet, out through the outlet, and onto the receiving surface of the spinner disc; (4) rotating the spinner disc with the motor to cause the associated salt or the like to be spread onto an associated ground surface in a manner that is significantly different than if step (B)(2) had not occurred; (5) using the adjustment mechanism to move the chute to adjust the outlet side to side a second direction that is substantially opposite to the first direction with respect to the receiving surface of the spinner disc; (6) dispensing the associated salt or the like from the associated hopper, into the inlet, out through the outlet, and onto the receiving surface of the spinner disc; and, (7) rotating the spinner disc with the motor to cause the associated salt or the like to be spread onto a ground surface in a manner that is significantly different than provided with step (B)(2).

According to yet another embodiment of this invention, a chute assembly method may comprise the steps of: (A) providing a chute assembly comprising: a frame comprising: (1) structure; and, (2) an arm having: a proximal end attached to the structure; and, a distal end; a spinner disc assembly comprising: (1) a spinner disc that: is supported to the arm; positioned near the distal end of the arm; and, has a receiving surface; and, (2) a motor that: is supported to the arm; a chute that is supported to the frame and that comprises a proximal end having an inlet and a distal end having an outlet; and, an adjustment mechanism supported to the frame; and, (B) wherein the chute assembly is operable to perform the steps of: (1) mounting the structure to an associated hopper that dispenses associated salt or the like; (2) using the adjustment mechanism to move the chute to adjust the outlet side to side a first direction with respect to the receiving surface of the spinner disc; (3) dispensing the associated salt or the like from the associated hopper, into the inlet, out through the outlet, and onto the receiving surface of the spinner disc; (4) rotating the spinner disc with the motor to cause the associated salt or the like to be spread onto an associated ground surface in a manner that is significantly different than if step (B)(2) had not occurred; (5) using the adjustment mechanism to move the chute to adjust the outlet forward to back a first direction with respect to the receiving surface of the spinner disc, wherein movement forward to back is substantially perpendicular to movement side to side; (6) dispensing the associated salt or the like from the associated hopper, into the inlet, out through the outlet, and onto the receiving surface of the spinner disc; and, (7) rotating the spinner disc with the motor to cause the associated salt or the like to be spread onto a ground surface in a manner that is significantly different than provided with step (B)(2).

Various benefits and advantages of this invention will become apparent to those skilled in the art to which it pertains upon reading and understanding of the following detailed specification.

III. BRIEF DESCRIPTION OF THE DRAWINGS

Advantages of the present invention will be readily appreciated as the same becomes better understood by reference to the following detailed description when considered in connection with the accompanying drawings wherein:

FIG. 15 is a top view of a chute according to an exemplary embodiment of the invention;

FIG. 16 is a side view of the chute;

FIG. 17 is a bottom view of the chute;

FIG. 18 is a front view of the chute;

FIG. 19 is a perspective view of the chute; and,

IV. DETAILED DESCRIPTION OF AN EXEMPLARY EMBODIMENT OF THE INVENTION

Figure 1:
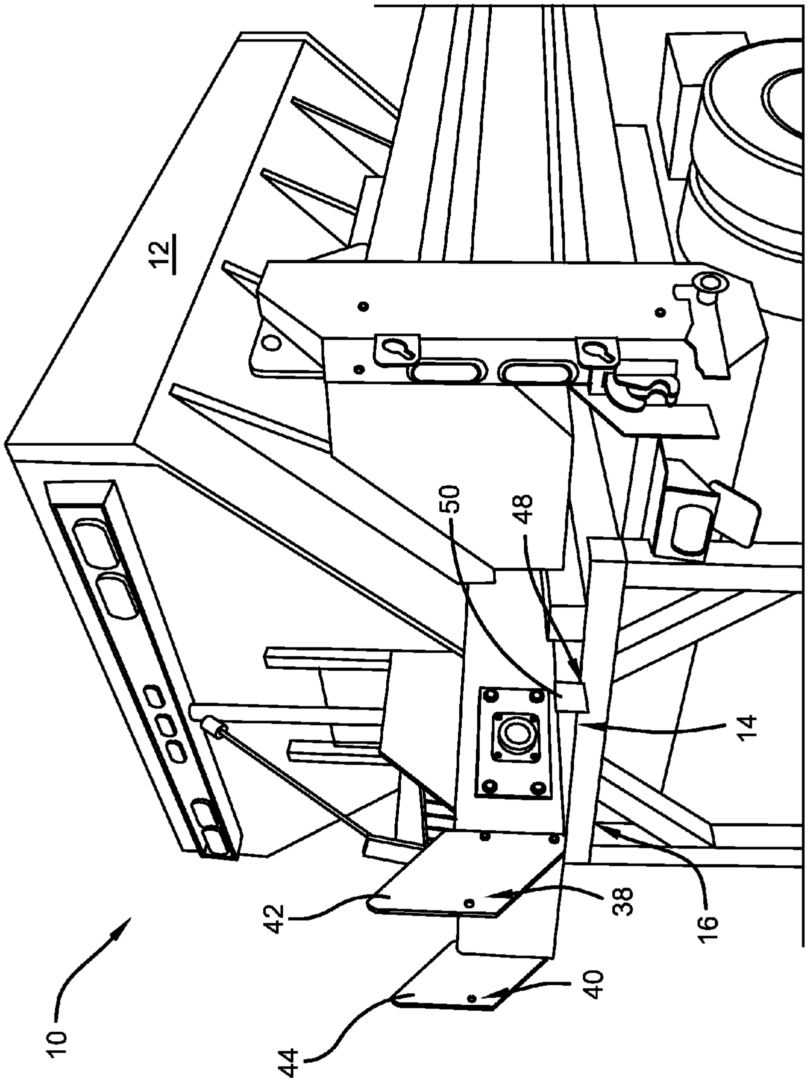
FIG. 1 is a perspective view of a portion of a spreader assembly according to an embodiment of the invention.

This invention generally relates to the apparatus and methods for directing spreader spray. Referring now to the drawings wherein the showings are for purposes of illustrating embodiments of the invention only and not for purposes of limiting the same, and wherein like reference numerals are understood to refer to like components, FIG. 1 shows a portion of a spreader assembly 10. The exemplary spreader assembly 10 includes a hopper 12 for holding a quantity of salt and an extraction assembly 14 for drawing salt out of the hopper 12. The extraction assembly 14 can be a conveyor system or an auger system or any other arrangement. Salt can be dispensed through an opening that is not visible, but located at reference 16.

Figure 2:
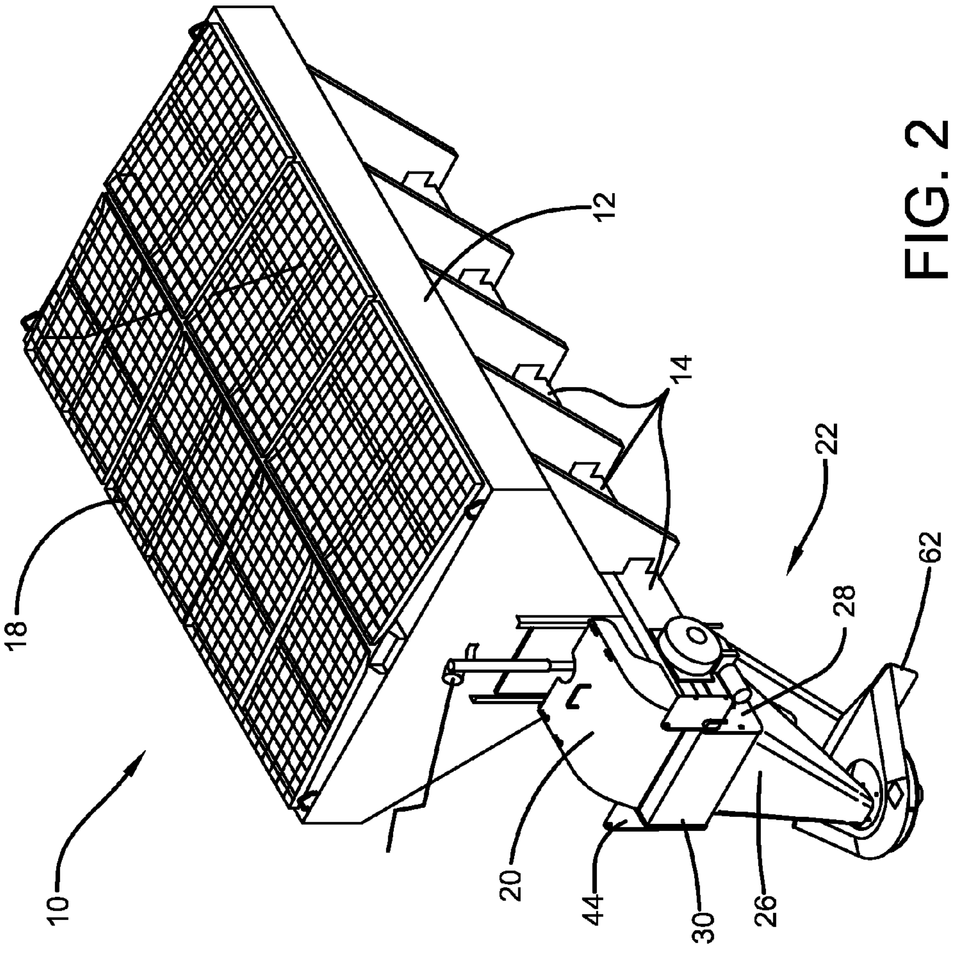
FIG. 2 is a perspective view of the spreader assembly according to an embodiment of the invention.
Figure 4:
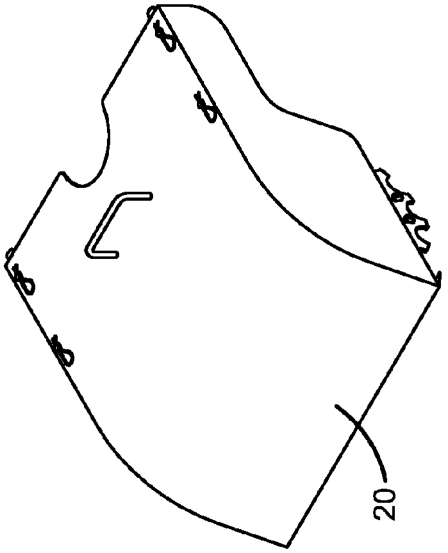
FIG. 4 is a perspective view of the flow equalizer shown in FIG. 3.
Figure 6:
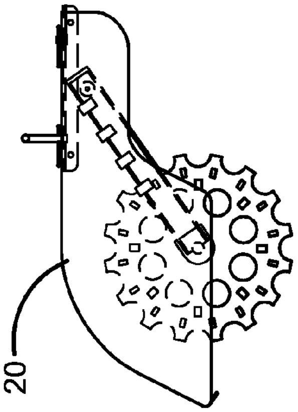
FIG. 6 is a side view of the flow equalizer shown in FIGS. 3-5.
Figure 3:
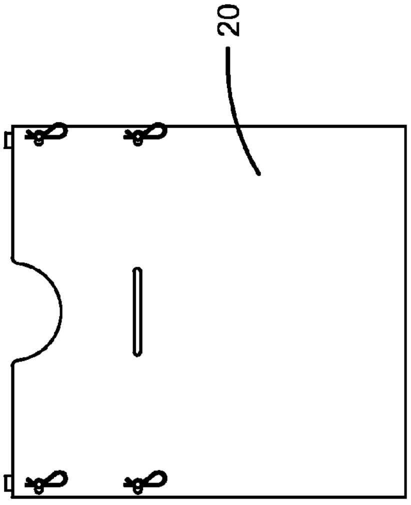
FIG. 3 is a top view of a flow equalizer according to an embodiment of the invention.
Figure 5:
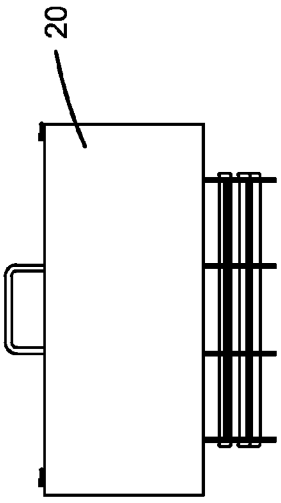
FIG. 5 is a front view of the flow equalizer shown in FIGS. 3 and 4.

FIG. 2 is a perspective view of the spreader assembly 10 according to an embodiment of the invention. The hopper 12 and the extraction assembly 14 are shown with other components of the exemplary embodiment. A screen 18 can be desirable to prevent large debris from being received in the hopper 12. The screen 18 can also desirably cause clumps of salt to be broken during filling of the hopper 12. A flow equalizer 20 can cover the opening. Side and front views of the flow equalizer are shown in FIGS. 3-6. The side view reveals hidden portions of the flow equalizer in phantom. The spreader assembly 10 also includes a chute assembly 22.

Figure 7:
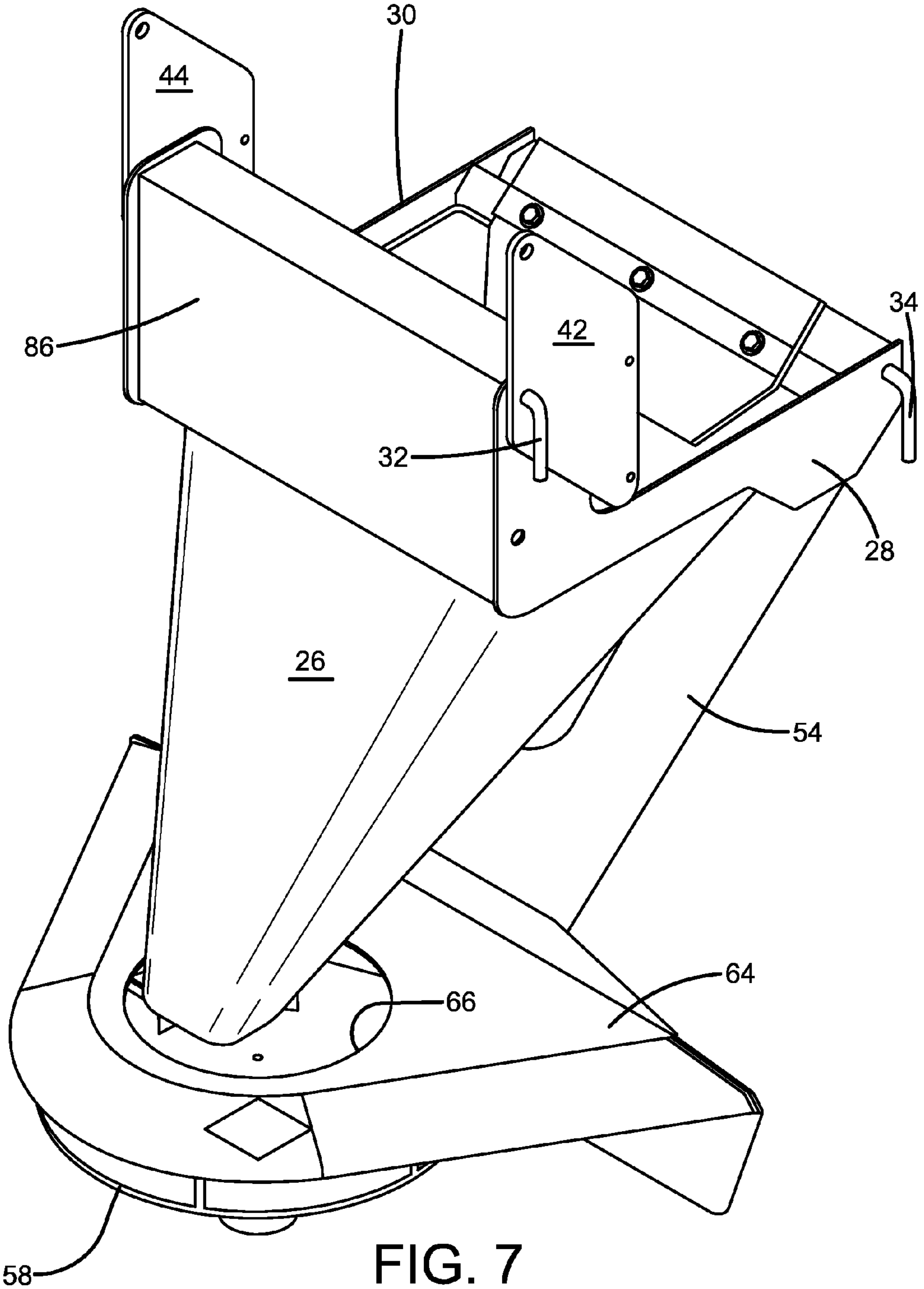
FIG. 7 is a perspective view of a chute assembly according to an embodiment of the invention.
Figure 8:
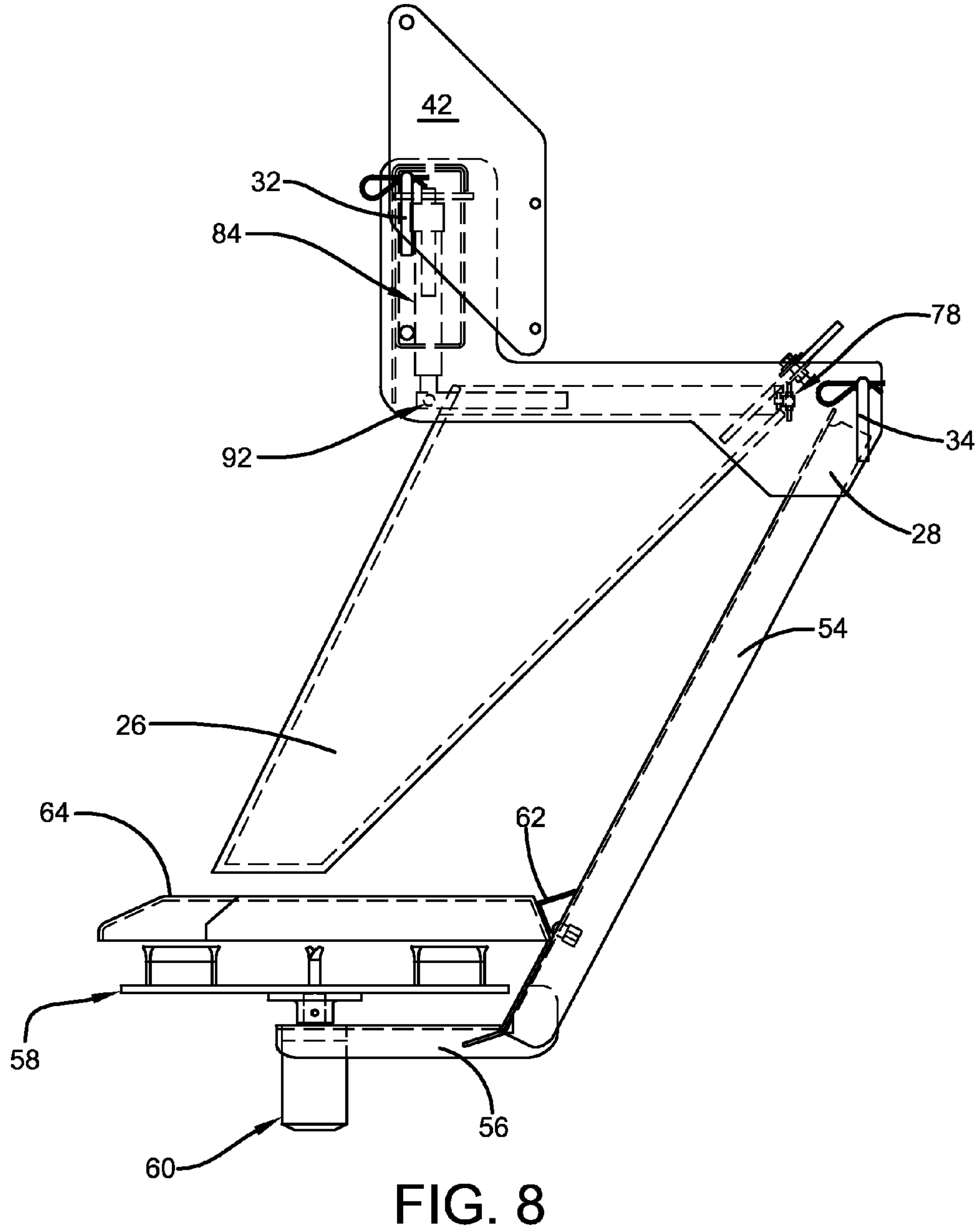
FIG. 8 is a side view of the chute assembly and shows internal structures in phantom.

FIG. 7 is a perspective view of the chute assembly 22. FIG. 8 is a side view of the chute assembly 22 and shows internal structures in phantom. The chute assembly 22 includes a frame 24 and a chute 26. The chute 26 is supported by the frame 24 for pivoting movement along two axes that are transverse to one another.

The frame 24 is shown in FIGS. 9-13. The frame 24 can include side members 28, 30. With reference now to FIGS. 1 and 7, the exemplary chute assembly 22 can be connected to other structures associated with the exemplary spreader assembly 10 through a pair of rods 32, 34. The rod 32 can be received in apertures in the side members 28, 30 (such as aperture 36) and apertures 38, 40 in plates 42, 44. The plates 42, 44 can be fixedly mounted to the extraction assembly 14. The rod 34 can be received in apertures in the side members 28, 30 (such as aperture 46) and apertures in other plates mounted to the extraction assembly (such as aperture 48 in plate 50).

The frame 24 can also include an arm 52 engaged with the side members 28, 30. The arm 52 can be fixed to the side members 28, 30 or can be mounted for pivoting movement relative to the side members 28, 30. The exemplary arm 52 can include a first portion 54 and a second or distal portion 56. An angle other than 180 degrees can be defined between the first and second portions 54, 56. The arm 52 can support a spinner disc 58 for rotation relative to the second portion 56. The spinner disc 58 can include a plurality of flites and can be driven in rotation by a motor 60. The motor 60 can be an electric motor, an hydraulic motor, or another kind of motor. A baffle 62 can be mounted on the arm 52 to reduce the likelihood that salt will be sprayed at the vehicle carrying the spreader assembly 10. A cover 64 can be mounted on the baffle 62 and extend across the spinner disc 58. The cover 64 can include an opening 66 and salt can pass through the opening 66 to reach the spinner disc 58.

Figure 14:
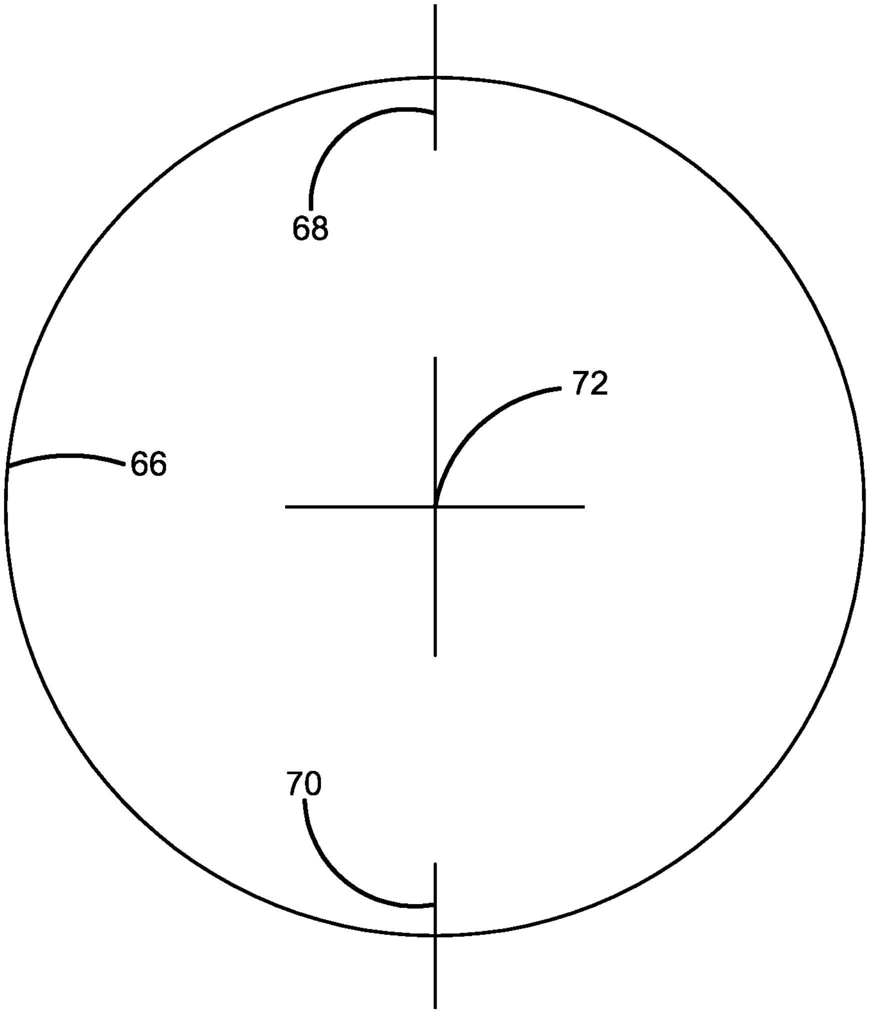
FIG. 14 is a reference image showing the various positions of a spinner disc or a cover opening that can be targeted by a chute assembly of an exemplary embodiment of the invention.

Salt can pass from the extraction assembly 14, between the side members 28, 30, and be received in the chute 26. The salt can pass through the chute 26, enter the opening 66, contact the spinner disc 58 and the flites thereon, and be directed onto a roadway. The chute 26 is mounted on the frame 24 for pivoting movement along two axes that are transverse to one another. As a result, the exemplary chute 26 can be moved relative to the frame 24 so that the chute 26 can be pointed at various positions of the spinner disc 58. FIG. 14 is a reference image showing the various positions of the spinner disc 58 or the cover opening 66 that can be targeted by a chute assembly of an exemplary embodiment of the invention. It is noted that the spinner disc 58 will be rotating during operation and thus any location on the spinner disc 58 itself will not be fixed. Thus, the circle shown in FIG. 14 can be viewed as the cover opening 66 since the cover 64 will remain essentially fixed during operation.

As used herein, the twelve o'clock position of spinner disc 58 is referenced by mark 68. The six o'clock position of spinner disc 58 is referenced by mark 70. The axis of rotation of the spinner disc 58 is referenced at 72. Generally, the twelve and six o'clock positions can be disposed along a longitudinal axis of the vehicle carrying the spreader assembly 10 or parallel to the longitudinal axis. The axis 72 extends transverse and usually perpendicular to the longitudinal axis of the vehicle, but intersects the axis between the twelve and six o'clock positions. The axis between the twelve and six o'clock positions can be viewed as extending "forward to back." An axis extending between three and nine o'clock positions can be viewed as "side-to-side" or lateral. The twelve o'clock position can be viewed as being closer to the vehicle than the six o'clock position. The chute 26 can be moved such that salt can be primarily/intentionally directed to any position about the circle 66.

The chute 26 is shown in FIGS. 15-19. The chute 26 can extend between an inlet 74 and an outlet 76. Salt can be received in the inlet 74 and discharged through the outlet 76. The exemplary chute 26 is a molded plastic structure, but chutes can be made with other materials in alternative embodiments of the invention. As best shown in FIG. 17, the interior cavity of the chute 26 can converge between the inlet 74 and the outlet 76.

Figure 12:
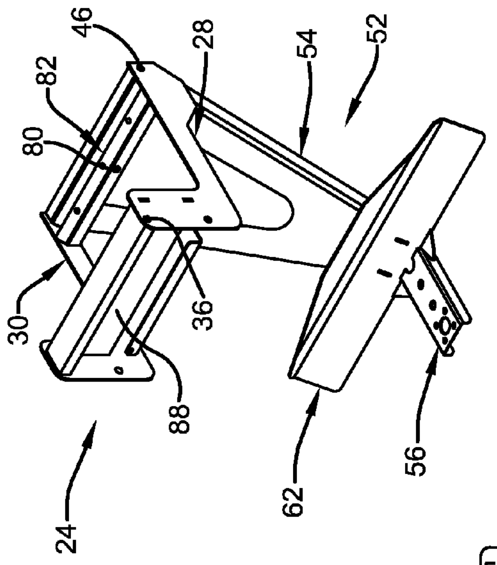
FIG. 12 is a perspective view of the frame.
Figure 13:
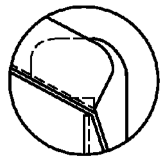
FIG. 13 is a detail view of the frame based on the detail line 13 shown in FIG. 11.
Figure 11:
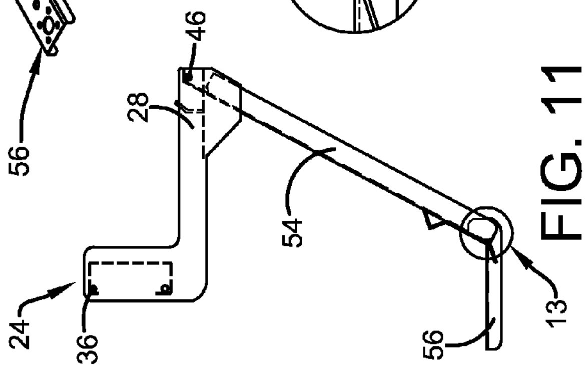
FIG. 11 is a side view of the frame.
Figure 9:
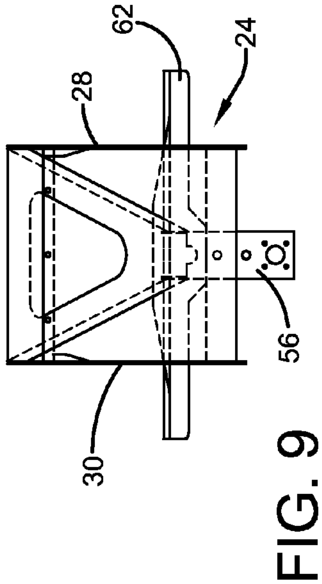
FIG. 9 is a top view of a frame for the exemplary chute assembly.
Figure 10:
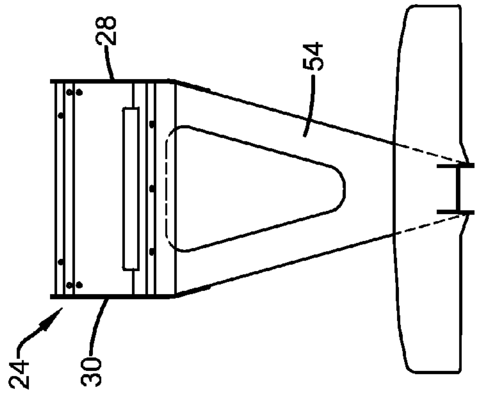
FIG. 10 is a front view of the frame.

At a top, forward end, the chute 26 can include a pin 78. The pin 78 can be received in an aperture 80 of a cross-member 82. As best shown in FIG. 12, the cross-member 82 can be mounted on the side members 28, 30 of the frame 24.

Figure 20:
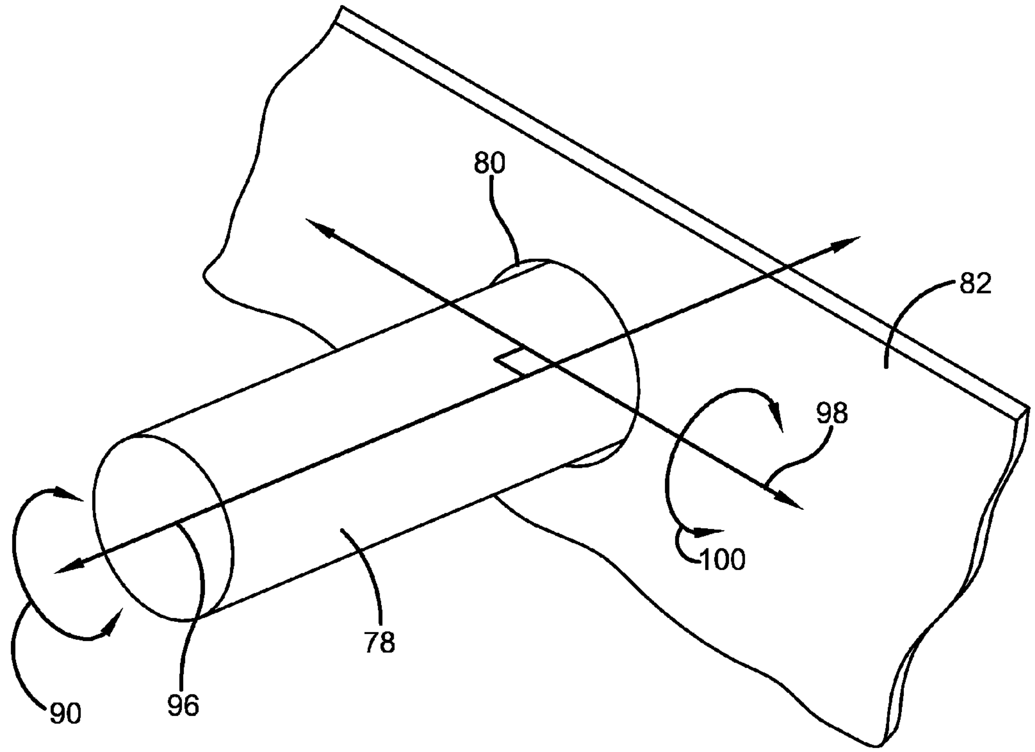
FIG. 20 is a magnified perspective view of a pin of the chute received in an aperture of the frame.

The pin 78 and aperture can engage one another such that the pin 78 (and thus the chute 26) is substantially prevented from translating laterally or up and down. In other words, rectilinear movement of the pin 78 can be prevented by the aperture 80. The pin 78 and aperture can engage one another such that the pin 78 is operable to rotate in the aperture 80. The chute 26 is thus operable to pivot about the longitudinal axis 96 of the pin 78 (shown in FIG. 20). Pivoting movement of the chute 26 is referenced at 90. This movement 90 of the chute 26 causes the outlet 76 to shift laterally relative to the opening 66, between the three and nine o'clock positions for example.

The chute 26 can be moved by actuators mounted on the frame 24. FIG. 8 shows one of the actuators in phantom, actuator 84. An actuator is mounted on each of the side members 28, 30. In FIG. 7, a cover 86 conceals the actuators. FIG. 12 shows a compartment 88 in which the actuators can be mounted and covered by the cover 86.

Each actuator can include an arm that can extend and retract, such as a hydraulic cylinder, an electric worm drive, or a pneumatic cylinder. The distal end of the arm can be engaged with one of two brackets 92, 94 of the chute 26. In one approach to controlling the chute 26, when the arms of both actuators are extended a first distance, the outlet 76 can be centered on the opening 66. This first distance can be less than full extension and greater than 5 maximum retraction. When the arms of the actuators are both fully extended, the outlet 76 can be directed at the twelve o'clock position of the opening 66. When the arms of the actuators are both fully retracted, the outlet 76 can be directed at the twelve o'clock position of the opening 66. This forward to back movement is accommodated by the engagement between the pin 78 and the aperture 80. The cross-member 82 can be relatively thin such that the pin 78 can pivot about an axis 98 that extends across the aperture 80. This axis 98 would be transverse and possibly perpendicular to the longitudinal axis 96 of the pin 78. The pivoting movement is referenced at 100. Thus, the exemplary chute 26 can have a single mount through the pin 78 that supports pivoting movement about multiple axes.

It is noted that forward to back pivoting movement can also be supported in an embodiment in which the cross-member 82 is pivotally mounted on the side members 28, 30. In such an embodiment, the cross-member 82 could be thicker and/or the aperture 80 could form a tighter fit around the pin 78. The pin 78 could still be operable to pivot about its longitudinal axis 96.

The actuators can also move independently from one another to produce lateral movement. For example, the actuator engaged with the bracket 94 can be energized to extend its arm. The other actuator can remain de-energized. This action can cause the outlet 76 to shift laterally to the three o'clock position of the opening 66. Alternatively, the actuator engaged with the bracket 92 can be energized to extend its arm. The other actuator can remain de-energized. This action can cause the outlet 76 to shift laterally to the nine o'clock position of the opening 66. Alternatively, the actuators can each be energized differently. For example, the actuator engaged with the bracket 94 can be energized to extend its arm and the actuator engaged with the bracket 92 can be energized to extend its arm, however the actuator engaged with the bracket 94 can be energized to extend its arm a greater distance than the arm of the actuator engaged with the bracket 92. This action can cause the outlet 76 to shift laterally to the position between one o'clock and two o'clock of the opening 66 (analogous to an hour hand of a clock at 1:30). Alternatively, the actuator engaged with the bracket 92 can be energized to extend its arm a greater distance than the arm of the actuator engaged with the bracket 94. This action can cause the outlet 76 to shift laterally to the position between ten o'clock and eleven o'clock of the opening 66 (analogous to an hour hand of a clock at 10:30).

Each arm/bracket connection can be arranged to prevent binding at the connection or stress on the actuators. Possibly, the actuators can be mounted to the side members 28, 30 through a pivoting connection. Also, since the outlet 76 is spaced further from the pivot axis than the brackets 92, 94, relatively small movement of the brackets 92, 94 can yield more significant movement at the outlet 76, reducing the likelihood of problematic binding/stress.

It has been observed that directing the outlet 76 at the six o'clock position can result in salt being primarily dispensed in the lane in which the vehicle is traveling. It has been observed that directing the outlet 76 at the twelve o'clock position can result in salt being dispersed over three lanes, including the lane in which the vehicle is traveling and lanes on opposite sides of the vehicle. It has been observed that directing the outlet 76 at the nine o'clock position can result in salt being primarily dispensed in the lane to the right (the passenger side) of the lane in which the vehicle is traveling. It has been observed that directing the outlet 76 at the three o'clock position can result in salt being primarily dispensed in the lane to the left (the driver's side) of the lane in which the vehicle is traveling. It has been observed that directing the outlet 76 at the "ten-thirty" position can result in salt being primarily dispensed in the direction away from the spinner disc 58 corresponding to "four-thirty." It has been observed that directing the outlet 76 at the "two-thirty" position can result in salt being primarily dispensed in the direction away from the spinner disc 58 corresponding to "eight-thirty."

Embodiments of the invention can be retrofit kits to existing spreader assemblies. Controls for the actuators can be hardwired from within the cab of the vehicle carrying the spreader assembly, or can be wireless.

We claim:

1. A chute assembly comprising:

a frame comprising: (1) structure that is designed to be mounted to an associated hopper that dispenses salt or the like; and, (2) an arm having: a proximal end attached to the structure; and, a distal end;

a spinner disc assembly comprising: (1) a spinner disc that: is supported to the arm; positioned near the distal end of the arm; and, has a receiving surface; and, (2) a motor that: is supported to the arm; and, rotates the spinner disc;

a chute that is supported to the frame and that comprises a proximal end having an inlet and a distal end having an outlet; wherein the chute is positioned to communicate associated salt or the like from the associated hopper, into the inlet, out through the outlet, and onto the receiving surface of the spinner disc;

an adjustment mechanism that is supported to the frame and that moves the chute to adjust the outlet: (1) forward to back with respect to the receiving surface of the spinner disc; and, (2) side to side with respect to the receiving surface of the spinner disc; and, wherein movement forward to back is substantially perpendicular to movement side to side.

2. The chute assembly of claim 1 wherein the adjustment mechanism comprises:

an opening formed in one of the chute and the structure;

a pin that: extends from the other of the chute and the structure; and, is received in the opening; and, an actuator that: is supported to the frame; connected to the chute; and, operates to rotate the chute about a longitudinal axis of the pin to adjust the outlet side to side with respect to the receiving surface of the spinner disc.

3. The chute assembly of claim 1 wherein the adjustment mechanism comprises:

an opening formed in one of the chute and the structure;

a pin that: extends from the other of the chute and the structure; and, is received in the opening;

a first actuator that: is supported to the frame; and, connected to a first side of the chute;

a second actuator that: is supported to the frame; and, connected to a second side of the chute; and, wherein the first and second actuators operate to rotate the chute about an axis that is substantially perpendicular to a longitudinal axis of the pin to adjust the outlet forward to back with respect to the receiving surface of the spinner disc.

4. The chute assembly of claim 1 wherein the adjustment mechanism comprises:

an opening formed in one of the chute and the structure;

a pin that: extends from the other of the chute and the structure; and, is received in the opening;

a first actuator that: is supported to the frame; and, connected to a first side of the chute;

a second actuator that: is supported to the frame; and, connected to a second side of the chute;

wherein the first actuator operates to rotate the chute in a first direction about a longitudinal axis of the pin to adjust the outlet side to side with respect to the receiving surface of the spinner disc; and, wherein the second actuator operates to rotate the chute in a second direction that is opposite the first direction about the longitudinal axis of the pin to adjust the outlet side to side with respect to the receiving surface of the spinner disc.

5. The chute assembly of claim 1 wherein the structure comprises:

first and second side members each having first and second apertures;

first and second rods;

wherein the first rod is received in the first aperture of the first side member and the first aperture of the second side member; and, wherein the second rod is received in the second aperture of the first side member and the second aperture of the second side member.

6. The chute assembly of claim 1 further comprising:

a cover that: is connected to the distal end of the arm; has an opening; and, is positioned so that the opening is above the receiving surface of the spinner disc; and, wherein the chute is positioned to communicate the associated salt or the like from the associated hopper, into the inlet, out through the outlet, through the opening, and onto the receiving surface of the spinner disc.

7. The chute assembly of claim 6 wherein:

the arm comprises: a first proximal portion connected attached to the structure; and, a second distal portion that: is connected to the first portion; and, angled with respect to the first portion;

the spinner disc is supported to the second distal portion of the arm; and, the cover is supported to the first proximal portion of the arm.

8. A chute assembly method comprising the steps of:

(A) providing a chute assembly comprising: a frame comprising: (1) structure; and, (2) an arm having: a proximal end attached to the structure; and, a distal end; a spinner disc assembly comprising: (1) a spinner disc that: is supported to the arm; positioned near the distal end of the arm; and, has a receiving surface; and, (2) a motor that: is supported to the arm; a chute that is supported to the frame and that comprises a proximal end having an inlet and a distal end having an outlet; and, an adjustment mechanism supported to the frame; and, (B) wherein the chute assembly is operable to perform the steps of:

(1) mounting the structure to an associated hopper that dispenses associated salt or the like;

(2) using the adjustment mechanism to move the chute to adjust the outlet side to side a first direction with respect to the receiving surface of the spinner disc;

(3) dispensing the associated salt or the like from the associated hopper, into the inlet, out through the outlet, and onto the receiving surface of the spinner disc;

(4) rotating the spinner disc with the motor to cause the associated salt or the like to be spread onto an associated ground surface in a manner that is significantly different than if step (B)(2) had not occurred;

(5) using the adjustment mechanism to move the chute to adjust the outlet side to side a second direction that is substantially opposite to the first direction with respect to the receiving surface of the spinner disc;

(6) dispensing the associated salt or the like from the associated hopper, into the inlet, out through the outlet, and onto the receiving surface of the spinner disc; and, (7) rotating the spinner disc with the motor to cause the associated salt or the like to be spread onto a ground surface in a manner that is significantly different than provided with step (B)(2).

9. The chute assembly method of claim 8 wherein:

step (A) comprises the step of: providing the adjustment mechanism with: an opening formed in one of the chute and the structure; a pin that: extends from the other of the chute and the structure; and, is received in the opening; a first actuator that: is supported to the frame; and, connected to a first side of the chute; and, a second actuator that: is supported to the frame; and, connected to a second side of the chute;

step (B)(2) comprises the step of: operating the first actuator to rotate the chute about a longitudinal axis of the pin to adjust the outlet side to side the first direction; and, step (B)(5) comprises the step of: operating the second actuator to rotate the chute about the longitudinal axis of the pin to adjust the outlet side to side the second direction.

10. The chute assembly method of claim 8 wherein step (B) further comprises the step of:

using the adjustment mechanism to move the chute to adjust the outlet forward to back a first direction with respect to the receiving surface of the spinner disc, wherein movement forward to back is substantially perpendicular to movement side to side.

11. A chute assembly method comprising the steps of:

(A) providing a chute assembly comprising: a frame comprising: (1) structure; and, (2) an arm having: a proximal end attached to the structure; and, a distal end; a spinner disc assembly comprising: (1) a spinner disc that: is supported to the arm; positioned near the distal end of the arm; and, has a receiving surface; and, (2) a motor that: is supported to the arm; a chute that is supported to the frame and that comprises a proximal end having an inlet and a distal end having an outlet; and, an adjustment mechanism supported to the frame; and, (B) wherein the chute assembly is operable to perform the steps of:

(1) mounting the structure to an associated hopper that dispenses associated salt or the like;

(2) using the adjustment mechanism to move the chute to adjust the outlet side to side a first direction with respect to the receiving surface of the spinner disc;

(3) dispensing the associated salt or the like from the associated hopper, into the inlet, out through the outlet, and onto the receiving surface of the spinner disc;

(4) rotating the spinner disc with the motor to cause the associated salt or the like to be spread onto an associated ground surface in a manner that is significantly different than if step (B)(2) had not occurred;

(5) using the adjustment mechanism to move the chute to adjust the outlet forward to back a first direction with respect to the receiving surface of the spinner disc, wherein movement forward to back is substantially perpendicular to movement side to side;

(6) dispensing the associated salt or the like from the associated hopper, into the inlet, out through the outlet, and onto the receiving surface of the spinner disc; and, (7) rotating the spinner disc with the motor to cause the associated salt or the like to be spread onto a ground surface in a manner that is significantly different than provided with step (B)(2).

12. The chute assembly method of claim 11 wherein:

step (A) comprises the step of: providing the adjustment mechanism with: an opening formed in one of the chute and the structure; a pin that: extends from the other of the chute and the structure; and, is received in the opening; a first actuator that: is supported to the frame; and, connected to a first side of the chute; and, a second actuator that: is supported to the frame; and, connected to a second side of the chute; and, step (B)(2) comprises the step of: operating the first and second actuators to rotate the chute about an axis that is substantially perpendicular to a longitudinal axis of the pin to adjust the outlet forward to back the first direction with respect to the receiving surface of the spinner disc.

13. The chute assembly method of claim 11 wherein step (B) further comprises the steps of:

using the adjustment mechanism to move the chute to adjust the outlet forward to back a second direction that is substantially opposite the first forward to back direction with respect to the receiving surface of the spinner disc;

dispensing salt or the like from the hopper, into the inlet, out through the outlet, and onto the receiving surface of the spinner disc; and, rotating the spinner disc with the motor to cause the salt or the like to be spread onto a ground surface in a manner that is significantly different than provided with step (B)(7).

14. The chute assembly method of claim 11 wherein:

step (A) comprises the step of: providing the adjustment mechanism with: an opening formed in one of the chute and the structure; a pin that: extends from the other of the chute and the structure; and, is received in the opening; and, an actuator that: is supported to the frame; and, connected to the chute; and, step (B)(2) comprises the step of: operating the actuator to rotate the chute about a longitudinal axis of the pin to adjust the outlet side to side the first direction.

15. The chute assembly method of claim 11 wherein:

step (A) comprises the step of: providing the adjustment mechanism with: an opening formed in one of the chute and the structure; a pin that: extends from the other of the chute and the structure; and, is received in the opening; a first actuator that: is supported to the frame; and, connected to a first side of the chute; and, a second actuator that: is supported to the frame; and, connected to a second side of the chute;

step (B)(2) comprises the step of: operating the first actuator to rotate the chute about a longitudinal axis of the pin to adjust the outlet side to side the first direction; and, step (B) further comprises the step of: operating the second actuator to rotate the chute about the longitudinal axis of the pin to adjust the outlet side to side a second direction with respect to the receiving surface of the spinner disc that is opposite the first direction.

16. The chute assembly method of claim 11 wherein:

step (A) comprises the step of: providing the structure with: first and second side members each having first and second apertures; and, first and second rods; and, step (B)(1) comprises the steps of: inserting the first rod into the first aperture of the first side member and the first aperture of the second side member; and, inserting the second rod into the second aperture of the first side member and the second aperture of the second side member.

17. The chute assembly method of claim 11 wherein:

step (A) comprises the step of: providing the chute assembly with a cover that: is connected to the distal end of the arm; has a cover opening; and, is positioned so that the cover opening is above the receiving surface of the spinner disc;

step (B)(3) comprises the step of: dispensing the associated salt or the like through the cover opening before dispensing the associated salt or the like onto the receiving surface of the spinner disc; and, step (B)(6) comprises the step of: dispensing the associated salt or the like through the cover opening before dispensing the associated salt or the like onto the receiving surface of the spinner disc.

* * * * *